United States Patent
Arul et al.

(10) Patent No.: US 9,680,261 B2
(45) Date of Patent: Jun. 13, 2017

(54) INTRINSIC SAFE IN-LINE ADAPTOR WITH INTEGRATED CAPACITIVE BARRIER FOR CONNECTING A WIRELESS MODULE WITH ANTENNA

(71) Applicant: Honeywell International Inc., Morristown, NJ (US)

(72) Inventors: Antony Baskar Arul, Chennai (IN); Gopalakrishnan Rangarajulu, Bangalore (IN); Bart Meijer, 's Gravenhage (NL)

(73) Assignee: Honewell International Inc., Morris Plains, NJ (US)

( * ) Notice: Subject to any disclaimer, the term of this patent is extended or adjusted under 35 U.S.C. 154(b) by 531 days.

(21) Appl. No.: 14/301,550

(22) Filed: Jun. 11, 2014

(65) Prior Publication Data
US 2015/0366084 A1    Dec. 17, 2015

(51) Int. Cl.
| | | |
|---|---|---|
| *H01R 13/62* | (2006.01) | |
| *H01R 13/66* | (2006.01) | |
| *H01R 43/00* | (2006.01) | |
| *H01R 24/48* | (2011.01) | |
| *H01Q 1/00* | (2006.01) | |

(52) U.S. Cl.
CPC ......... *H01R 13/6625* (2013.01); *H01Q 1/002* (2013.01); *H01R 24/48* (2013.01); *H01R 43/005* (2013.01); *Y10T 29/49149* (2015.01)

(58) Field of Classification Search
CPC .......................... H01R 43/005; H01R 13/6625
See application file for complete search history.

(56) References Cited

U.S. PATENT DOCUMENTS

| | | | |
|---|---|---|---|
| 6,397,322 B1 | 5/2002 | Voss | |
| 6,789,205 B1 | 9/2004 | Patino et al. | |
| 6,980,174 B2 | 12/2005 | Flasza et al. | |
| 7,312,716 B2 | 12/2007 | Kothari et al. | |
| 7,507,105 B1 * | 3/2009 | Peters .................... | H01R 13/53 439/374 |

(Continued)

FOREIGN PATENT DOCUMENTS

KR    10-1050539 B1    7/2011

OTHER PUBLICATIONS

PCT International Search Report for PCT/US2015/031728 dated Aug. 31, 2015.

*Primary Examiner* — James Harvey
(74) *Attorney, Agent, or Firm* — Kermit D. Lopez; Luis M. Ortiz; Ortiz & Lopez, PLLC

(57) ABSTRACT

An intrinsic safe in-line adaptor with an integrated capacitive barrier for connecting a wireless module with an antenna. The in-line adaptor (e.g., N-type to N-type) can be designed to include an intrinsic safe circuit and the integrated capacitive barrier. The intrinsic safe circuit further includes a multi-layer PCB and the PCB can be potted and sealed with a mechanical metal casing. The intrinsic safe capacitive barrier can be integrated with a coaxial connector and mounted as part of a flameproof enclosure to meet an explosion safety standard and an intrinsic safety requirement. The mechanical metal casing can be isolated by the enclosure (e.g., rubber) to meet isolation requirements. The wireless module can be directly connected with the antenna utilizing the in-line adaptor via the coaxial connector and without any specific cable assembly.

20 Claims, 4 Drawing Sheets

(56) References Cited

U.S. PATENT DOCUMENTS

| | | |
|---|---|---|
| 8,223,027 B2 | 7/2012 | Jenkins et al. |
| 8,451,176 B2 | 5/2013 | Biswas et al. |
| 2004/0194994 A1* | 10/2004 | Rasmussen .......... H01Q 1/1207 174/76 |
| 2006/0077612 A1 | 4/2006 | Kothari et al. |
| 2006/0128199 A1* | 6/2006 | Hedtke ................. G01D 11/24 439/320 |
| 2009/0253388 A1* | 10/2009 | Kielb .................... G01D 21/00 455/117 |
| 2009/0311975 A1* | 12/2009 | Vanderaa ............. G01D 11/245 455/90.3 |
| 2010/0244806 A1 | 9/2010 | Probst et al. |
| 2010/0315298 A1 | 12/2010 | Biswas et al. |
| 2011/0171497 A1* | 7/2011 | McGuire ............. H01M 2/0443 429/7 |
| 2013/0049984 A1 | 2/2013 | Harper, Jr. |
| 2013/0241416 A1 | 9/2013 | Toth |
| 2013/0303094 A1 | 11/2013 | Schubert |
| 2015/0366084 A1* | 12/2015 | Arul .................... H01R 43/005 361/752 |
| 2016/0072228 A1* | 3/2016 | Shih ........................ H01G 4/30 439/620.21 |
| 2016/0104979 A1* | 4/2016 | Korn .................... H01R 13/622 439/620.21 |
| 2016/0146924 A1* | 5/2016 | Williams .............. G01F 23/284 342/124 |
| 2016/0262254 A1* | 9/2016 | Meijer ................. G01F 23/284 |

\* cited by examiner

INTRINSIC SAFE IN-LINE ADAPTOR WITH INTEGRATED CAPACITIVE BARRIER FOR CONNECTING A WIRELESS MODULE WITH ANTENNA

FIELD OF THE INVENTION

Embodiments are generally related to intrinsic safe circuits and devices. Embodiments are also related to wireless devices. Embodiments are additionally related to an intrinsic safe in-line adaptor with an integrated capacitive barrier for connecting a wireless module with an antenna.

BACKGROUND

In industrial process control systems, wireless networks are widely deployed to support sensing and monitoring of industrial processes. Such networks permit industrial processes to be monitored utilizing a wireless sensor without incurring the costs typically associated with wired devices. Such wireless sensors, however, are often required to be compliant with intrinsic safety standards in order to be used in certain applications. For example, wireless sensors may be required to satisfy a "zone 2" (e.g., marginally hazardous) or "zone 0" (e.g., highly hazardous) level of certification.

Wireless sensors typically include an RF (Radio Frequency) or other wireless radio board along with an external antenna for better range performance. For a device to be intrinsically safe, a common constraint is that the antenna's ground and the radio board's ground should be completely isolated by certain distances (e.g., approximately 0.5 mm for "zone 2" and approximately 3.0 mm for "zone 0"). Unfortunately, this type of arrangement disturbs the matching between the antennas and the radio boards causing high RF or other losses due to ground discontinuities.

Most prior art wireless networks include a third party wireless module and/or a radio module, which are not designed with intrinsic safety considerations in mind with respect to an antenna port. Additionally, such devices and components do not meet the required higher level of intrinsic safe requirement to acquire an explosion proof product certification (e.g., ATEX & IECEx). Such prior art devices also typically cause reductions in the transmission of power and the receiver sensitivity of the wireless module by reducing the transmit power by approximately 3 dB. This affects the free space range of the wireless module by halving the range and their reliability.

Based on the foregoing, it is believed that a need exists for an improved intrinsic safe in-line adaptor with an integrated capacitive barrier and method for connecting a wireless module with an antenna, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved intrinsic safe circuits and devices.

It is another aspect of the disclosed embodiments to provide for improved wireless circuits.

It is yet another aspect of the disclosed embodiments to provide for an improved intrinsic safe in-line adaptor with an integrated capacitive barrier and a method thereof for connecting a wireless module with an antenna.

The aforementioned aspects and other objectives and advantages can now be achieved as described herein. An intrinsic safe in-line adaptor with an integrated capacitive barrier and method for connecting a wireless module with an antenna is disclosed herein. The in-line adaptor (e.g., N-type to N-type) can be designed to include an intrinsic safe circuit and the integrated capacitive barrier. The intrinsic safe circuit further includes a multi-layer PCB and the PCB can be potted and sealed with a mechanical metal casing. The intrinsic safe capacitive barrier can be integrated with a coaxial connector and mounted as part of a flameproof enclosure to meet an explosion safety standard and an intrinsic safety requirement. The mechanical metal casing can be isolated by the enclosure (e.g., rubber) to meet an isolation requirement. The wireless module can be directly connected with the antenna utilizing the in-line adaptor via the coaxial connector without any specific cable assembly and without any intrinsic safety violation.

The adaptor further includes a line bushing for assembly in a flameproof enclosure. The intrinsic safe capacitive barrier can be integrated with a coaxial lead wire and mounted as part of the flameproof enclosure to meet the intrinsic safety requirement. The intrinsic safe in-line adaptor with the integrated capacitive barrier reduces a number mechanical components employed in the wireless module. The in-line adaptor can be employed in association with a number of wireless products to meet the intrinsic safety requirement and to reduce the design cycle considerably and assist in quicker launch of product to market. The adaptor can be made as a complete mechanical unit with an explosion proof product certification. The in-line adaptor with the integrated capacitive barrier is intrinsically safe (I.S.) and can be placed in a hazardous area to create the wireless communication link.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
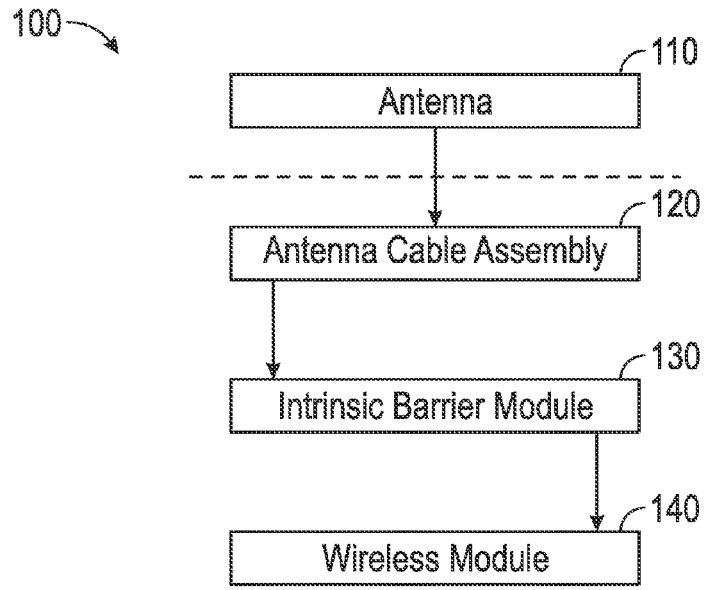
FIG. 1 illustrates a block diagram of a wireless module and an antenna connected via an additional add-on module at the antenna port of the wireless module.

FIG. 1 illustrates a system 100 that includes a wireless module 140, an antenna cable assembly 120 having an antenna 110 connected via an intrinsically safe (IS) barrier module 130. The intrinsically safe (IS) barrier module 130 is an add-on module that connects the wireless module 140 with the antenna 110. The problem associated with a component such as the additional add-on module 130 at the antenna port 110 of the wireless module 140 is that each add-on module 130 must meet the higher intrinsic safe requirement while designing. Similarly, the explosion proof product certification must be obtained for each additional add-on module 130 to ensure that they adhere to regulations regarding the use of RF spectrum.

Figure 2:
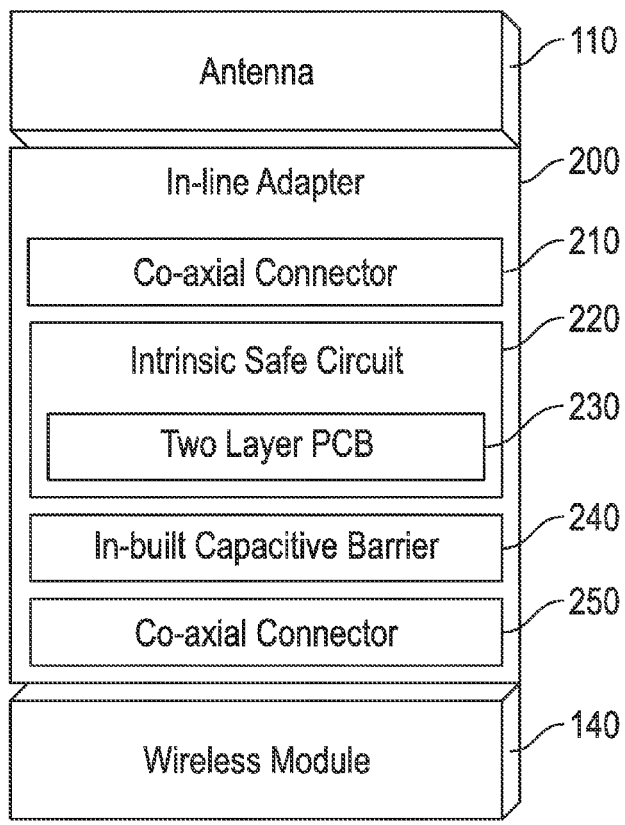
FIG. 2 illustrates a block diagram of a wireless module and an antenna directly connected via an intrinsically safe in-line adaptor, in accordance with the disclosed embodiments.

FIG. 2 illustrates a block diagram of a wireless module 140 and an antenna 110 directly connected via an intrinsically safe in-line adaptor 200, in accordance with the disclosed embodiments. Note that in FIGS. 1-5, identical or similar blocks are generally indicated by identical reference numerals. The antenna 110 and the wireless module 140 can be connected via the intrinsically safe in-line adaptor 200 having the coaxial connector 210 and 250. The in-line adaptor 200 can be, for example, an N-type to N-type in-line adaptor, depending upon design consideration. The in-line adaptor 200 generally includes an intrinsic safe circuit 220 and an integrated capacitive barrier 240 to meet intrinsically safe (IS) requirement. The circuit board 220 can be constructed from any suitable circuit board material and supports electrical interconnects. Additionally, circuit board 220 includes electrical circuitry to ensure that the module 140 complies with an intrinsic safety specification.

The capacitive barrier 240 can be integrated with or connected to the co-axial cable 250. The intrinsic safe circuit 220 can further include a multi-layer PCB 230 (e.g., in a rectangular or other non-rectangular form) and the intrinsic safe circuit 220 can be potted with a mechanical metal casing 290. The mechanical metal casing 290 can be constructed from any suitable metallic material that offers sufficient strength. Examples of such materials include stainless steel, aluminum, etc. The in-line adaptor 200 is intrinsically safe and can be placed in a hazardous area to create a wireless communication link. The wireless module 140 can transmit and/or receive an RF signal from a remote device or location.

Figure 3:
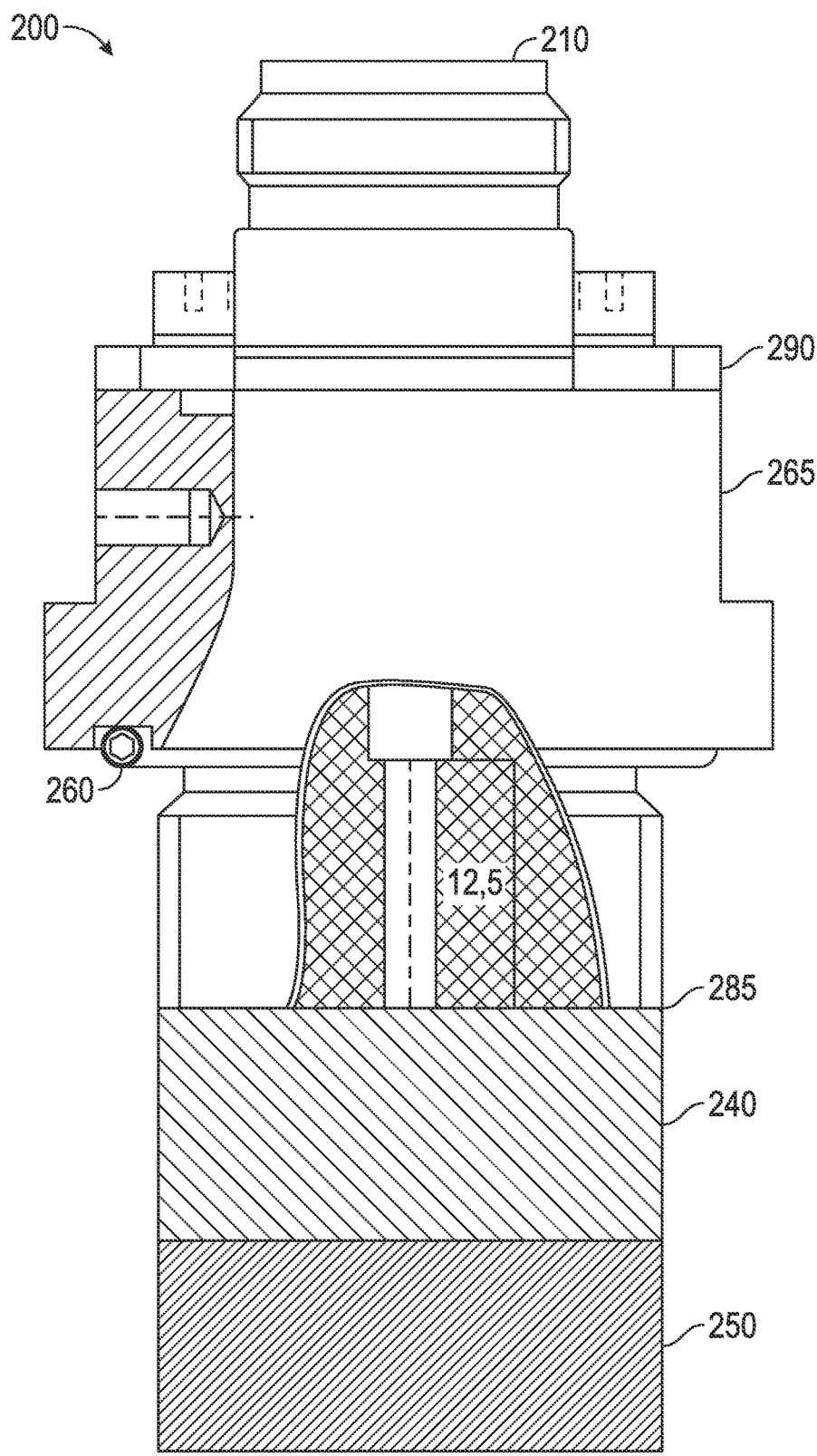
FIG. 3 illustrates a perspective view of the in-line adaptor having an intrinsic safe capacitive barrier and a coaxial connector, in accordance with the disclosed embodiments.

FIG. 3 illustrates a perspective view of the in-line adaptor 200 having an IS capacitive barrier 240 and a coaxial connector 250, in accordance with the disclosed embodiments. The in-line adaptor 200 includes a co-axial connector 210 at one end (see top of FIG. 3 drawing) and a co-axial connector 250 at the other end (bottom of the FIG. 3 drawing), along with a mechanical metal casing and a line bushing 265. An IS capacitive barrier 240 is located proximate to the co-axial connector 250 and an enclosure 285.

The enclosure 285 generally houses an intrinsic safety capacitive barrier integrated with a coaxial cable to meet explosion safety standards and entire intrinsic safety requirements. Note that the dashed line shown in FIG. 3 surrounding the enclosure 285 generally indicates an area with features including a flameproof (explosion proof) component, along with threading to screw into a flameproof (explosion proof) enclosure, and internal potting to meet flameproof (explosion proof) requirements and intrinsic safety requirements. The enclosure 285 can be constructed from any suitable material, for example, plastic. The mechanical metal casing 290 can be isolated by the enclosure 285 (e.g., rubber) to meet the isolation requirement. The adaptor 200 further includes a line bushing 265 for electrical connection between the flameproof enclosure 285 and the coaxial cable connector 250.

The in-line adaptor 200 is also preferably cylindrical, which preferably includes an O-ring seal 260 to generate an environmental seal between the rigid adapter 200 and the wireless module 140. The O-ring seal 260 can be formed of any suitable material, depending upon design consideration. The wireless module 140 can be directly connected with the antenna 110 using the adaptor 200 via the coaxial cable connectors 210 and 250 without any specific cable assembly or any intrinsic safety violation. The housing configuration 290 can assist to meet intrinsic safety requirements and provide flame proof (e.g., explosion proof) capability.

Figure 4:
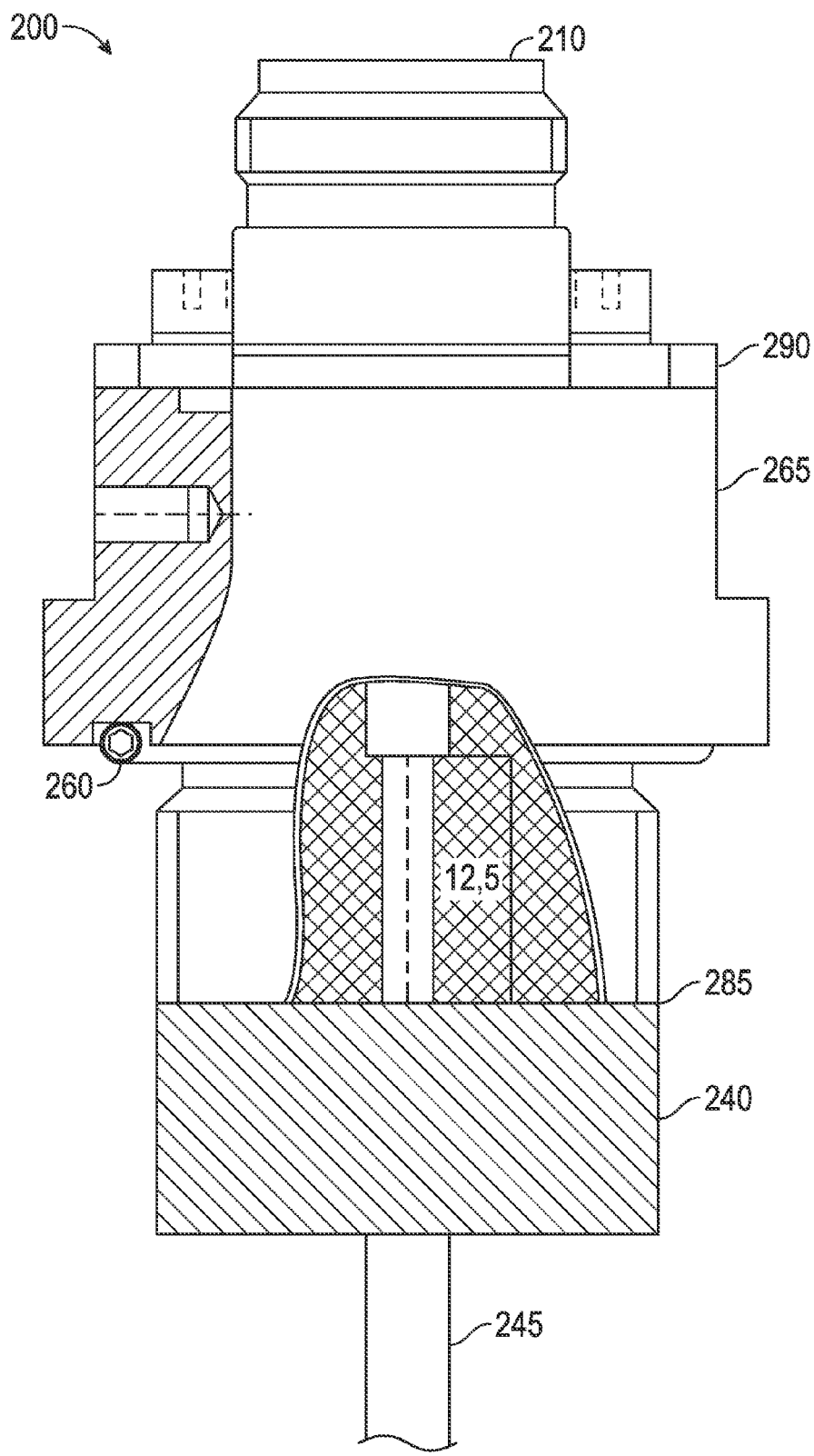
FIG. 4 illustrates a perspective view of the in-line adaptor having a coaxial lead wire soldered to IS capacitive barrier, in accordance with the disclosed embodiments.

FIG. 4 illustrates a perspective view of the in-line adaptor 200 having the coax lead wire 245 soldered to the IS capacitive barrier 240, in accordance with the disclosed embodiments. The wireless module 140 can be directly connected with the antenna 110 using the adaptor 200 via the coaxial component lead wire 245 without any intrinsic safety violation. Note that the coaxial component 245 may be a coaxial lead wire, a coaxial wire or a short coaxial cable assembly with, for example, a SMA or MMCX type of connector. The intrinsic safe in-line adaptor 200 with the integrated capacitive barrier 240 reduces mechanical components used in the wireless module 140.

Figure 5:
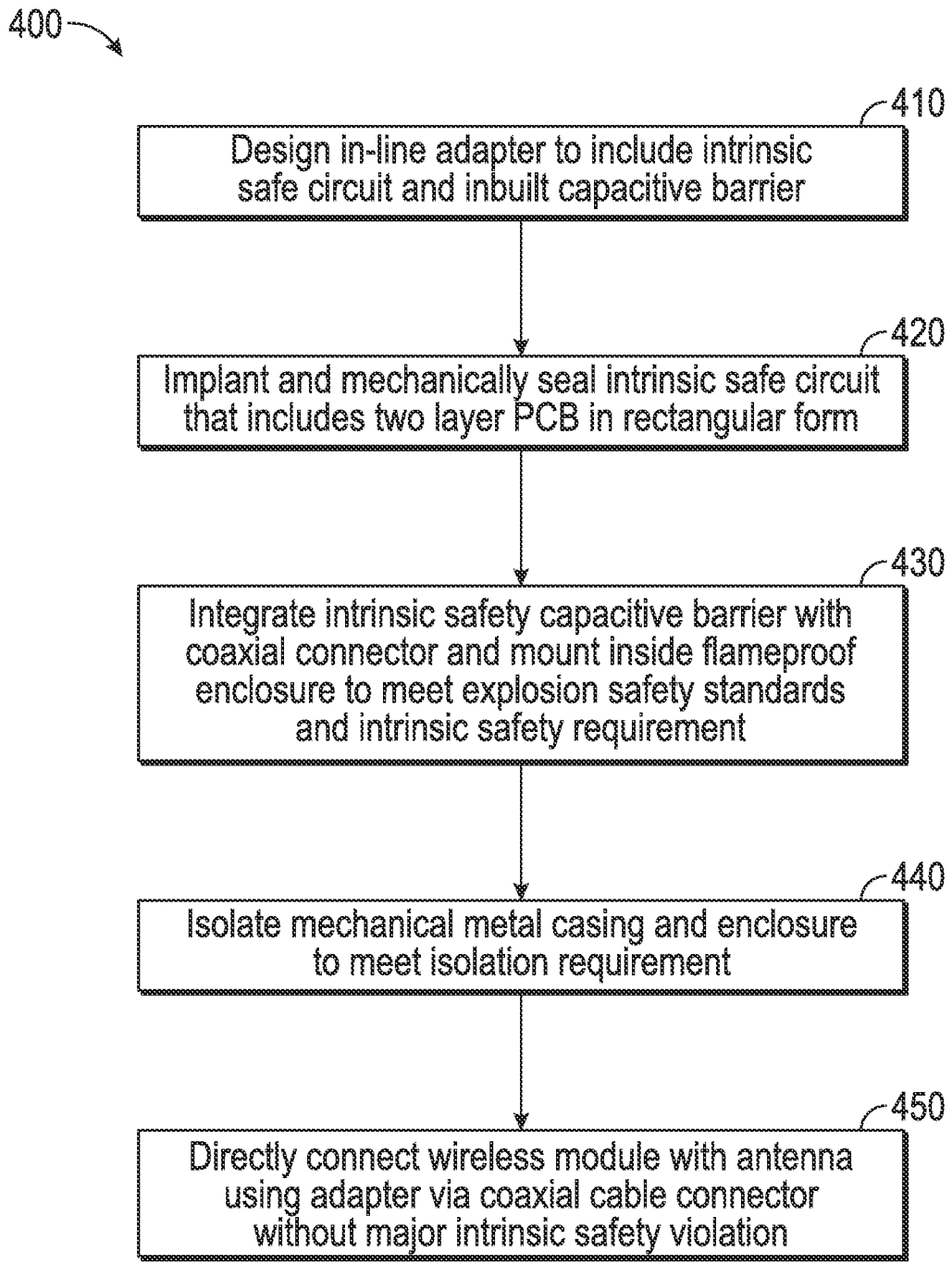
FIG. 5 illustrates a high level flow chart of operations illustrating logical operational steps of method for directly connecting a wireless module with an antenna via the intrinsic safe in-line adaptor with the integrated capacitive barrier, in accordance with a preferred embodiment.

FIG. 5 illustrates a high level flow chart of operations illustrating logical operational steps of method 400 for directly connecting the wireless module 140 with the antenna 110 via the intrinsic safe in-line adaptor 200 with integrated capacitive barrier 240, in accordance with the disclosed embodiments. The in-line adaptor 200 (e.g., N-type to N-type) can be designed to include the intrinsic safe circuit 220 and the integrated capacitive barrier 240 to meet IS requirement, as indicated at block 410.

The intrinsic safe circuit 220 can further include, for example, a multi-layer PCB 230 that is capable of being potted and mechanically sealed, as indicated at block 420. The intrinsic safety capacitive barrier 240 can also be integrated with the coaxial cables 250 and 245 and mounted within the enclosure 285 to meet explosion safety standards and all general intrinsic safety requirements, as illustrated at block 430. The mechanical metal casing 290 can also be isolated from the enclosure 285 to meet isolation requirements, as depicted at block 440. The wireless module 140 can be directly connected with the antenna 110 using the adaptor 200 via the coaxial cable connector 250 and 245 without any specific cable assembly or any intrinsic safety violation, as shown at block 450.

The in-line adaptor 200 can be employed in the context of a variety of wireless products to meet the intrinsic safety requirements and also to reduce the design cycle considerably while assisting in quicker launches of product-to-market deployment. The adaptor 200 is preferably configured as a complete mechanical unit, which can also be, for example, ATEX & IECEx certified. The adaptor 200 together with the integrated capacitive barrier 240 provides an intrinsically safe (I.S.) product that can be located in, for example, a hazardous area to create a wireless communication link.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for configuring an intrinsic safety device for use in wireless applications, comprising:
   configuring an in-line adaptor to include an intrinsic safe circuit and an integrated capacitive barrier such that said intrinsic safe circuit comprises a multi-layer printed circuit board sealed via a mechanical metal casing;
   integrating said integrated capacitive barrier with a coaxial connector and mounting said integrated capacitive barrier and said coaxial connector within a flameproof enclosure; and
   directly connecting a wireless module with an antenna utilizing said in-line adaptor via said coaxial connector.

2. The method of claim 1 further comprising:
   integrating said integrated capacitive barrier with a coaxial lead wire.

3. The method of claim 1 further comprising potting and mechanically sealing said printed circuit board via a mechanical metal casing.

4. The method of claim 3 further comprising isolating said mechanical metal casing from said flameproof enclosure.

5. The method of claim 1 further comprising reducing a plurality of mechanical components in association with said wireless module utilizing said in-line adaptor in association with said integrated capacitive barrier.

6. The method of claim 1 further comprising configuring said in-line adaptor in association with a plurality of wireless products to meet intrinsic safety requirements and reduce design cycles thereof.

7. The method of claim 1 wherein said in-line adaptor in association with said integrated capacitive barrier is intrinsically safe and capable of being located in a hazardous area to create a wireless communication link thereof.

8. An intrinsic safety apparatus for use in wireless applications, said apparatus comprising:
   an in-line adaptor that includes an intrinsic safe circuit and an integrated capacitive barrier said intrinsic safe circuit comprising a multi-layer printed circuit board sealed via a mechanical metal casing; and
   a coaxial connector wherein said integrated capacitive barrier is integrated with said coaxial connector, said integrated capacitive barrier and said coaxial connector mounted within a flameproof enclosure.

9. The apparatus of claim 8 further comprising a wireless module connected to an antenna via said in-line adaptor via said coaxial connector.

10. The apparatus of claim 8 wherein said integrated capacitive barrier is integrated with a coaxial lead wire.

11. The apparatus of claim 8 wherein said printed circuit board is potted and mechanically sealed via a mechanical metal casing.

12. The apparatus of claim 11 wherein said mechanical metal casing is isolated from said flameproof enclosure.

13. The apparatus of claim 8 further comprising a plurality of mechanical components reduced in association with said wireless module utilizing said in-line adaptor in association with said integrated capacitive barrier.

14. The apparatus of claim 8 wherein said in-line adaptor is configured in association with a plurality of wireless products to meet intrinsic safety requirements and reduce design cycles thereof.

15. The apparatus of claim 8 wherein said in-line adaptor in association with said integrated capacitive barrier is intrinsically safe and capable of being located in a hazardous area to create a wireless communication link thereof.

16. An intrinsic safety apparatus for use in wireless applications, said apparatus comprising:
   an in-line adaptor that includes an intrinsic safe circuit and an integrated capacitive barrier, said intrinsic safe circuit comprising a multi-layer printed circuit board sealed via a mechanical metal casing;
   a coaxial connector wherein said integrated capacitive barrier is integrated with said coaxial connector, said integrated capacitive barrier and said coaxial connector mounted within a flameproof enclosure; and
   a wireless module connected to an antenna via said in-line adaptor via said coaxial connector.

17. The apparatus of claim 16 wherein said integrated capacitive barrier is integrated with a coaxial lead wire.

18. The apparatus of claim 16 wherein:
   said printed circuit board is potted and mechanically sealed via a mechanical metal casing; and
   said mechanical metal casing is isolated from said flameproof enclosure.

19. The apparatus of claim 16 further comprising a plurality of mechanical components reduced in association with said wireless module utilizing said in-line adaptor in association with said integrated capacitive barrier.

20. The apparatus of claim 8 wherein:
   said in-line adaptor is configured in association with a plurality of wireless products to meet intrinsic safety requirements and reduce design cycles thereof; and
   said in-line adaptor in association with said integrated capacitive barrier is intrinsically safe and capable of being located in a hazardous area to create a wireless communication link thereof.

* * * * *